Figures 1, 7:
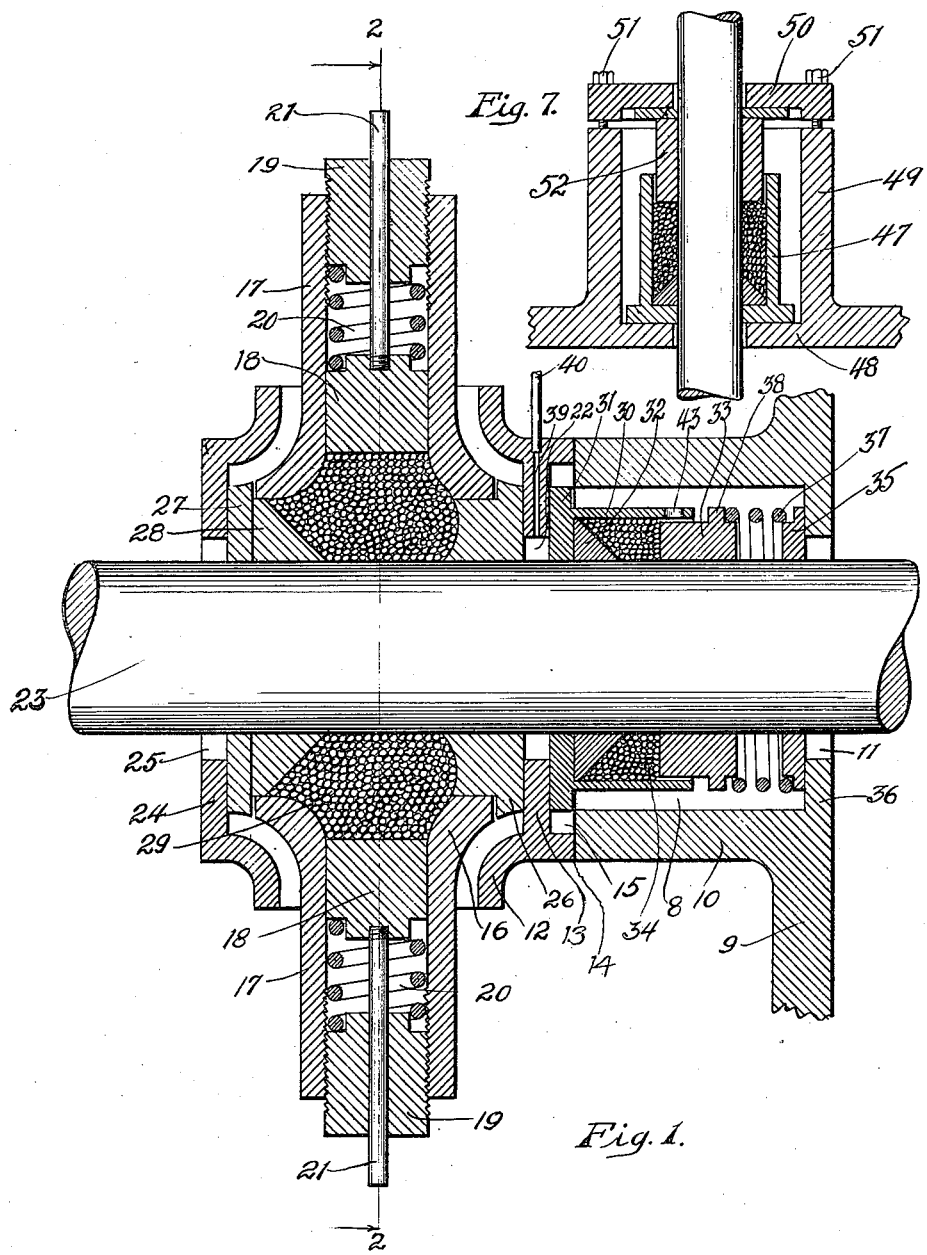

T. A. JOHNSTON.
ROD PACKING.
APPLICATION FILED APR. 18, 1910.

982,182.

Patented Jan. 17, 1911.
2 SHEETS—SHEET 1.

Witnesses:
Ephraim Banning
Mary R. Frost

Inventor:
Thomas A. Johnston.
BY Banning & Banning
Attorneys.

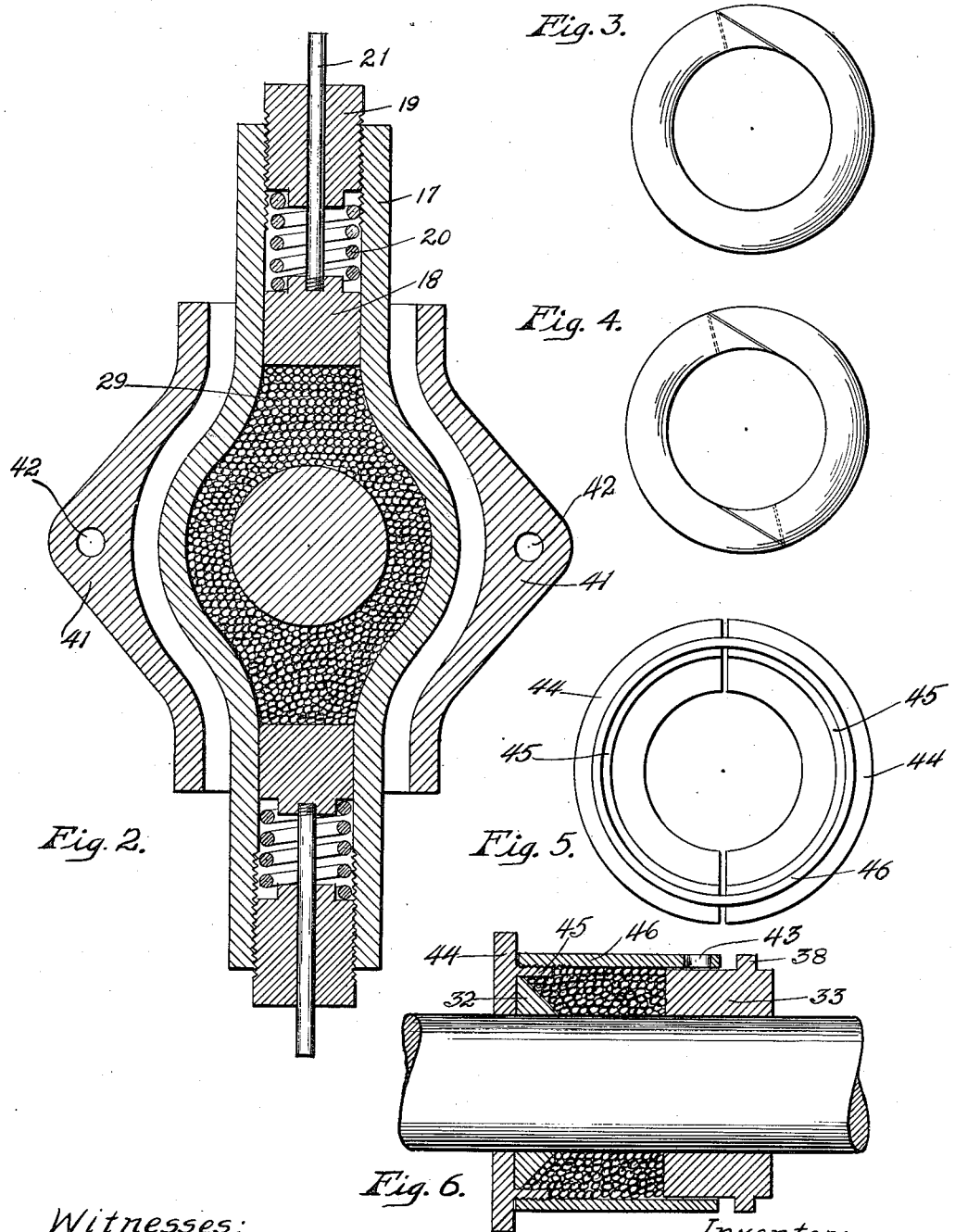

UNITED STATES PATENT OFFICE.

THOMAS A. JOHNSTON, OF CHADRON, NEBRASKA, ASSIGNOR OF ONE-FOURTH TO THOMAS L. FINLEY, OF LONG PINE, NEBRASKA.

ROD-PACKING.

982,182.  Specification of Letters Patent.  Patented Jan. 17, 1911.

Application filed April 18, 1910. Serial No. 556,101.

*To all whom it may concern:*

Be it known that I, THOMAS A. JOHNSTON, a citizen of the United States, residing at Chadron, in the county of Dawes and State of Nebraska, have invented certain new and useful improvements in rod-packing particularly for use on engines, air-compressors, ice-machines, and other similar mechanisms, of which the following is a specification.

This invention relates to a rod packing for piston rods and the like, and relates to improvements adapted for use in connection with either vibrating or non-vibrating rods—that is, rods which in their normal operation travel with a true, straight line reciprocation and rods which, either owing to their length or the stresses thrown upon them, vibrate slightly from side to side in operation.

This invention relates particularly to rod packings which make use of shot packing.

It relates to improvements upon the mechanism disclosed in Letters Patent of the United States, Nos. 779,480, 872,132, 894,739, 948,610 and 953,271, and has for objects to provide improved packing rings for use in conjunction with such shot packing, to provide a secondary packing shell which may be used when desired in the chamber or space ordinarily used in the type of packing which my invention is intended to displace; to provide simple means for permitting the introduction or replacement of the packing rings and other parts, and adjusting them accurately to the piston regardless of the exact diameter of the latter and regardless of shoulders which may exist on it near its ends; to provide a type of packing particularly suited for use in connection with piston rods or stationary engines or compressors and locomotives; to provide a type of packing especially adapted for use on vertical piston rods; to generally simplify the construction of rod packing, and in other ways to provide a new and improved rod packing which shall overcome difficulties and objections heretofore experienced in connection with such devices.

Other uses and objects will appear from a detailed description of the invention, which consists of the features of construction and combination of parts hereinafter described and claimed.

In the drawings—Figure 1 shows a cross section taken through the central portion of my improved packing, showing the supplemental shell introduced into the space ordinarily used for ring packings; Fig. 2 shows a cross section of the construction of Fig. 1, taken on the line 2—2 of Fig. 1 and looking in the direction of the arrows; Fig. 3 shows the form of ring intended for use on pistons and in locations where the rings can be introduced and adjusted by slipping them over the ends of the pistons; Fig. 4 shows a type of ring cut at diametrically opposite points into two similar pieces; Fig. 5 shows an end view of a modification of the supplemental shell, which modification consists in forming the end portion of said shell in two parts, provided with corresponding collars and adapted to be held together by means of a sleeve threaded on said collar; Fig. 6 shows a cross section through said modified type of supplemental packing shell; and Fig. 7 shows a cross section through a modified type of packing intended particularly for use on vertical piston rods which are not subject to excessive vibration.

In Figs. 1 and 2, the casing ordinarily used for ring packing is shown at 8 as integral with the cylinder head 9; this casing 8 comprises a circular wall 10 and communicates with the interior of the cylinder by means of an annular opening 11. My improved type of packing comprises an outer casing 12, intended to be fitted against the end of the wall 10 and provided with a partition or wall 13 set away from the contacting edge 14 so as to provide a space 15 between the end of the wall 10 and the partition 13. The outer casing 12 is made of split formation, so that an inner casing 16 may be inserted within it and properly adjusted, as will be hereinafter explained. This inner casing 16 is provided with a plurality of necks 17, into each one of which is introduced a follower or plug 18, of a size permitting free movement within. Each of the necks 17 is also provided with a compressor plug 19, which may be screwed in or out of the end of the neck at will. The plugs 19 act through the medium of springs 20 to effect compression on the followers 18. Although I have thus shown and described followers intended to be forced inwardly through the medium of springs, still it is evident that when desired the springs may be dispensed with and the plugs 19 may act directly upon the followers.

Each of the followers 18 has attached to it an indicator 21, which passes out through a hole in the corresponding compressor 19, so that the amount of indicator visible from the exterior of the mechanism will be a measure of the exact position of the corresponding follower.

The partition 13 is provided with an annular hole 22, of a size to permit free movement of the piston 23 therethrough, and the front wall 24 of the casing 12 is likewise provided with an annular opening 25 permitting free movement of the piston. An end ring 26 within the casing 12 abuts against the face of the partition 13 and fits closely around the piston 23. This ring serves the purpose of closing the opening 22 in the partition 13, so as to largely prevent steam or other gas from passing into the interior of the casing 12 by leakage through the opening 22. A ring 27 abuts against the inner face of the front wall 24 of the casing, and likewise fits closely around the piston 23, thereby closing the opening 25. A packing ring 28, set within the inner casing 16, likewise fits tightly around the piston 23 and abuts on its outer surface against the ring 27. This ring 28 is one of the elements to which this invention particularly relates, and will be more fully described in a later portion of the specification.

The interior space within the casing 16 is filled with shot and graphite, or other suitable packing material, 29, adapted to mold accurately about the piston rod and to fill all the interstices within the casing 16, thereby forming a secure, gas-tight packing, which will effectually prevent the leakage of gases along the piston rod from the ring 26 to the ring 28.

The supplemental casing or shell 30 seats within the casing 8. This casing or shell comprises an end wall 31 accurately machined or fitted so as to abut squarely up against the partition 13. Within this supplemental casing is a packing ring 32, which closely fits the piston rod and abuts against the end wall 31. A compressor plug 33 closely fitted to the piston works freely within the casing 30 so as to compress shot and graphite, or other suitable material 34, therewithin. A ring 35, which likewise accurately fits the piston rod, abuts against the outer face of the wall 36 which forms a portion of the cylinder head, said ring 35 acting to close the annular opening 11 within the cylinder head and providing an abutment against which a spring 37 may compress. The other end of this spring 37 presses against an annular shoulder 38 on the plug 33, thereby tending to force the latter into the supplemental shell 30 so as to compress the shot and graphite 34.

When desired, a hole 39 may be provided in the partition 13, and a suitable lubricant introduced into the space 22 through a connection 40.

The outer casing 12 is provided with a plurality of flanges 41, each provided with a hole 42 through which bolts or studs may be passed for drawing the casing against the wall 10 of the casing 8, which forms a portion of the cylinder head. The supplemental casing 30 is preferably provided in its upper portion with a hole 43, through which the shot and graphite 34 may be introduced, as will now be shown.

In order to assemble the various portions of my improved packing, the ring 35 should first be slipped onto the piston and moved into position against the wall 36. The spring 37 may then be brought up into position against the ring 35 and then the compressor block 33 will be moved up against the spring. The supplemental casing 30, having the ring 32 set within it, may then be slipped over the piston and moved up nearly into engagement with the compressor block 33, the hole 43, however, being still exposed so that the shot and graphite may be poured in through this hole to fill the supplemental casing. The latter may then be moved into firm engagement with the block 33. After this has been done, the outer casing 12, containing the inner casing 16 and rings 26, 27 and 28, may be inserted over the piston rod and drawn tightly into position against the wall 10 by means of studs passing through the holes 42. Tightening the outer casing against the wall 10 in this manner will force the supplemental casing 30, and the shot and graphite contained within it, tightly against the compressor 33, which will thereupon compress the spring 37, said compression increasing until the outer casing 12 has been brought into final position. Thereafter the shot and graphite 34 will continue to be held firmly against the piston by means of the spring 37, until a sufficient amount of the shot and graphite has been worn away to make necessary its replacement.

After the aforesaid parts have been adjusted, the lower follower 18, spring 20, and compressor plug 19 may be adjusted into position and the interior of the inner casing may then be filled with the shot and graphite 29. After this, the upper follower spring and compressor plug may be inserted and said compressor plugs adjusted until the desired amount of compression has been brought onto the shot and graphite 29.

It is intended that the rings 28 and 32 shall compress firmly against the piston rod, bearing evenly against the latter around its entire periphery. It is furthermore desired that the force which said rings shall exert against the piston rod shall increase when the compression on the shot and graphite is increased. To this end I prefer to form these rings of triangular cross section, as shown, and to split them on one side so that they may adjust themselves slightly to pistons of different diameters. Evidently rings of the form shown will be forced firmly into contact with the piston at all points, because the shot and graphite will press downwardly against the slanting upper surface. The shot and graphite will at the same time force them securely against the walls 27 and 31. Evidently the use of rings of this character will largely increase the effectiveness of my improved packing and will act in conjunction with the shot and graphite to produce a remarkably efficient and gas-tight joint. Inasmuch as these rings are split, and can thus adjust themselves to slight inequalities in the diameter of the piston, it is seen that the joint will be a tight one, whether the piston expand and contract with changes of temperature or not. This has heretofore been an obstacle which it has been extremely difficult to overcome, for it is evident that the temperature of the piston will change from time to time in service, thus expanding and contracting.

In Fig. 4 I show a modified form of packing ring, the modification consisting in cutting the ring on both sides so that it may be adjusted onto the piston without having to be slipped over the end thereof. This is a construction which would be used in cases where there existed shoulders near the ends of the piston rod of greater diameter than the central portion of the rod, or such rings would be used in locations where it would be difficult to slip the rings over the ends of the rods. In like manner, Figs. 5 and 6 show a modified construction of the supplemental casing, said modification being intended to accomplish results similar to those accomplished in using the modified type of ring. In Figs. 5 and 6 the end portion of the supplemental casing comprises two semicircular portions 44, each having a shoulder 45. These shoulders 45 are threaded in such manner that a sleeve 46 may be threaded on both of them, thus holding them together and at the same time holding the sleeve to both. This construction is found to be entirely satisfactory, the parts being easily adjusted on the piston and holding together firmly in usage.

In Fig. 7 I show a modified construction of packing in which only the supplemental casing 47 is used, this being inverted and resting on its bottom portion against the end wall 48 of a cylinder head. The casing 49 ordinarily used for packing purposes is provided with a cover or end wall 50, which may be drawn tightly into position, as by means of studs 51, said studs acting to force a compressor plug 52 firmly against the shot and graphite contained within the supplemental casing 47. This construction is an extremely simple one, and is found to be well adapted for use, especially on stationary engines, where an attendant may tighten up the studs 51 from time to time so as to maintain the compression on the shot and graphite and so as to keep the parts in proper adjustment.

It is seen that by forming the outer casing 12 with the partition 13 set away from the contacting edge 14 a larger amount of space will be available in which to place the supplemental casing 30, compressing plug 33, spring 37 and ring 35. However, in some locations the amount of space available within the casing 8 ordinarily used for packing purposes will be sufficient to contain the supplemental casing 30 and associated parts, and in such a case it would not be necessary to set the partition or wall 13 away from the contacting edge 14.

It is seen that whatever steam leaks past the ring 35 will cause a pressure to be exerted against the compressor plug 33 of the supplemental packing casing. This additional pressure will serve to reinforce the pressure exerted by the spring, and such reinforcement will occur at the very time when it is most needed and desirable, namely, when the steam pressure in the cylinder is greatest and when therefore the tendency for leakage to occur will also be greatest.

I claim:

1. A rod packing comprising an inner and outer casing and a packing ring within said inner casing and encircling the rod, said packing ring being of triangular cross section, the oblique face of said packing ring being adjacent the interior of the casing, substantially as described.

2. In a rod packing, a casing, an end wall in said casing having therein an annular opening adapted to receive the piston rod, and a packing ring within said casing encircling the piston rod, said packing ring being of substantially triangular cross section, the slanting face of said packing ring being adjacent the interior of the casing, substantially as described.

3. In a rod packing, an inner and outer casing and a supplemental casing, said outer casing provided near one end with a partition having therein an annular opening of a size substantially larger than the rod, said supplemental casing provided with an end wall adapted to abut said partition, the end wall having therein an annular opening of a size to receive the piston, packing material within said supplemental casing, and means for compressing said packing material against the piston, substantially as described.

4. In a rod packing, an outer casing and a supplemental casing, the outer casing provided near one end with a partition having therein an opening substantially larger than the piston rod, the supplemental casing provided with an end wall adapted to abut the partition, said end wall having therein a hole adapted to receive the rod, a packing ring within said supplemental casing adapted to abut the piston rod, packing within the supplemental casing, and means for compressing said packing, substantially as described.

5. In a rod packing, a casing, a packing ring within the casing adjacent one end thereof and encircling the piston rod, packing material within the casing and means for compressing said packing material, said packing ring being of substantially triangular cross section, said packing material adapted to contact the slanting face of the packing ring, substantially as described.

6. In a rod packing, a casing, a packing ring within the casing and adjacent one end thereof and adapted to encircle the piston rod, said packing ring being of substantially triangular cross section, the slanting face of said packing ring being adjacent the interior of the casing, and there being a cut in the packing ring, substantially as and for the purpose set forth.

7. In a device of the class described a cylinder head and a packing casing on the end of the cylinder head, and an outer casing in contact with the end of said packing casing, the outer casing being provided near one end with a partition, an annular opening in the partition adapted to receive a piston rod, and a supplemental casing within said packing casing, said supplemental casing provided with an end wall having therein an annular opening of the size to receive the rod, said end wall being in contact with the partition, packing within said supplemental casing and a compressor plug compressing said packing, the interior of said packing casing being in communication with the interior of the cylinder, substantially as described.

8. In a rod packing, a packing casing, a yieldable packing body within the casing, and means for compressing said yieldable packing body within the casing, the casing comprising an end wall in the form of a plurality of sections, coöperating side walls, and means for retaining the end wall sections in coöperative relation to the side walls whereby the yieldable packing may be compressed within the casing, substantially as described.

THOMAS A. JOHNSTON.

Witnesses:
    Thomas A. Banning, Jr.,
    Ephraim Banning.